UNITED STATES PATENT OFFICE.

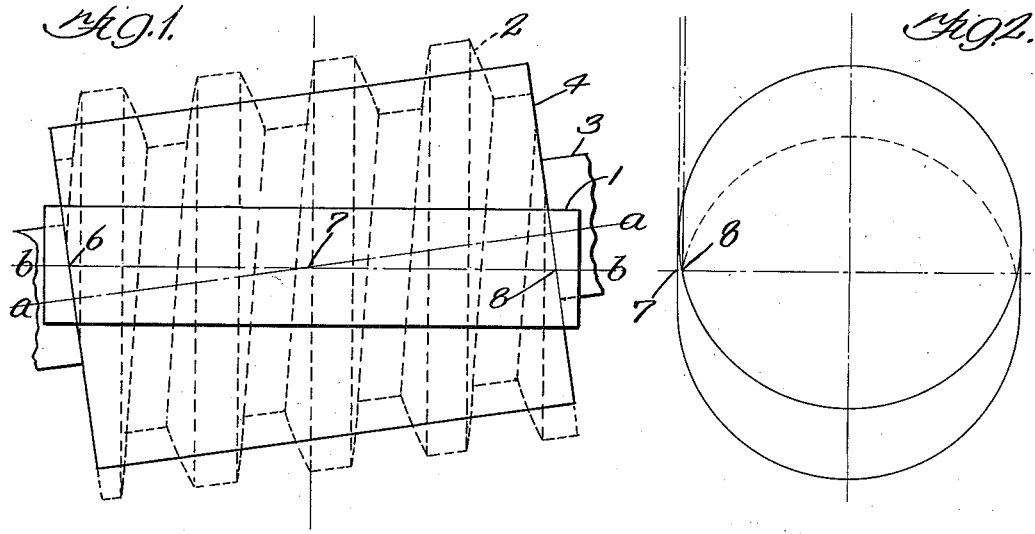
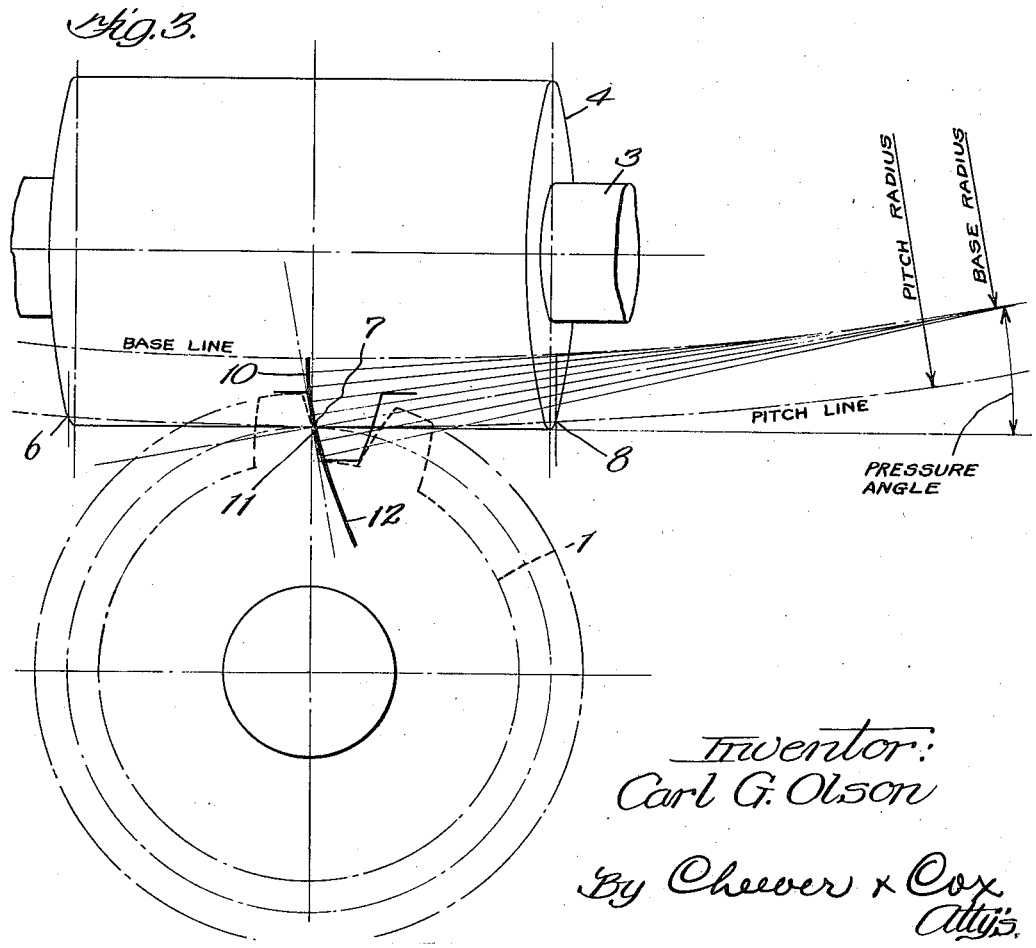

CARL G. OLSON, OF CHICAGO, ILLINOIS, ASSIGNOR TO ILLINOIS TOOL WORKS, OF CHICAGO, ILLINOIS, A CORPORATION OF ILLINOIS.

HOB FOR CUTTING INVOLUTE GEARS.

1,383,844.      Specification of Letters Patent.      Patented July 5, 1921.

Application filed October 24, 1919. Serial No. 333,075.

*To all whom it may concern:*

Be it known that I, CARL G. OLSON, a citizen of the United States, residing at Chicago, in the county of Cook and State of Illinois, have invented a certain new and useful Improvement in Hobs for Cutting Involute Gears, of which the following is a specification.

My invention relates to hobbing cutters or "hobs" of the helicoidal type to be used in connection with the cutting of involute gears by the molding generating process usually known as the "hobbing" process.

The primary object of this invention is to provide a hob that will produce theoretically correct involute gears either of the ordinary spur gear type or of the helical type such as spiral gears, herringbone gears, and the like. To produce hobs capable of producing theoretically correct gears requires a modification in the methods usually employed and it is this modification which is believed to be new in the manufacture of hobs.

In order that this matter may be better understood, a brief general description of the subject will be of assistance in understanding the invention.

Involute gears can be generated or molded by a rack having straight sided teeth, and a hob is usually regarded as such a rack wrapped around a cylinder but having the rack teeth arranged spirally to enable the gear to be generated when the hob rotates.

Hobs are ordinarily made straight fluted or gashed, for the smaller helix angles, and spirally or helically fluted for greater angles. The dividing line is usually at 3° to 4°. Straight fluted hobs have the flutes or gashes parallel to the axis and spiral fluted hobs have the flutes at right angles to the helix formed by the teeth or lead of the thread, the flutes thus extending spirally, as the threads of a screw.

In the ordinary straight fluted hob, if an axial section be taken, the profile of the section will be the same as a rack having straight sided teeth. But a hob made according to this old method with straight sided teeth should theoretically have no lead, for straight sided teeth, when arranged helically, do not produce perfect gear teeth.

The spirally or helically fluted hob is also made with straight sided teeth although collectively the teeth adjacent to any given flute form a helix or spiral. This helix represents a bent rack with the bends between the teeth only, forming an interrupted curve; in other words, a portion of the perimeter of a polygon having straight sides equal in length to the circular pitch of the gears the hob is to cut. A hob so constructed will not generate perfect involute gears. The helix formed by the teeth adjacent to any given flute should be a continuous uniform curve.

It has been recognized that straight sided teeth do not generate perfect involute curves except in the case of a rack; and attempts have been made to correct the inaccuracy, but I have solved the problem by a method believed to be new.

When in use, for example in cutting plain spur gears, the hob axis does not lie in a plane normal to the axis of the work but at an angle thereto depending upon the angle of lead of the hob teeth or the "helix angle" or "thread angle" of the hob. Let us apply the term "plane of the gear" to that plane which is normal to the axis of the gear and to the pitch line of the momentarily acting hob tooth. Let us also apply the term "pitch cylinder" to the imaginary cylinder which contains the pitch line of all the hob teeth and is of a length equal to the length of the hob. The line where the plane of the gear intersects the pitch cylinder of the hob is a curve which conforms to the arc of an ellipse taken at its flattest part. By finding the circle which most closely conforms to this arc, and using it as the pitch line for the acting hob tooth, I produce a gear tooth which is, practically speaking, theoretically perfect. In other words, instead of using a radius of infinite diameter in calculating the profile of an individual hob tooth, as heretofore, I employ a radius which will describe that circular arc which most nearly conforms to the arc of the ellipse formed by the intersection of the plane of the gear with the pitch cylinder of the hob. The "plane of the gear" may also be termed the "cutting plane of the hob"—that is, the imaginary plane which, according to my method, is passed through or caused to "cut" the pitch cylinder of the hob to form a basis for calculating the radius of the proper pitch circle for the hob teeth. Of course in employing this method the shape of the elliptical arc will be influenced by the ratio which the diameter of the pitch circle bears to its length—that is, the diameter of the hob relative to its length. The hob teeth produced by my method are most accurate when the pitch diameter is substantially equal to the length of the hob,—and the fact is that this proportion of substantially one to one, is the proportion most commonly used in actual practice to-day. It will also be understood that in passing the cutting plane through the pitch cylinder the plane will be centered—that is, it will cut the hob axis midway between its ends.

In practice, it will be understood, of course, that the length of the hob and the diameter of the pitch line or pitch cylinder are factors which have previously been decided upon. The same is true of the thread angle. These terms having been given, it is simply a matter of computation by well known methods to discover the radius of a circle which will pass through the middle and the two end points of the elliptical arc formed by the intersection of the "cutting plane" or "plane of the gear" with said "pitch cylinder" of the hob. Having thus obtained the radius of the proper pitch circle it is a simple matter by proceeding along well known methods to determine the proper base circle to employ in forming the profile of an individual hob tooth.

To explain more in detail the method of computation, it may be said that by the terms of the problem, the length and diameter of the cylinder are given, also the angle at which the "cutting plane" is to pass through it. Consequently, it is merely a matter of trigonometry to find the location of the three points which will lie at the middle of the elliptical arc and at the two ends thereof. These three points having been determined it is a simple trigonometric problem to find the circle which will pass through these three points. The circle thus found constitutes the proper pitch circle to employ in calculating the correct profile for the individual hob teeth. Of course, this circle may also be found by the graphical method—that is, by the rules of descriptive geometry.

In order to explain the principle visibly, reference is made to the accompanying drawings in which—

Figure 1 is a front elevation of a gear blank illustrating in dotted lines the position which a hob would occupy in cutting it. In full lines is shown a rectangle representing the pitch cylinder.

Fig. 2 is an end view looking toward the left in Fig. 1.

Fig. 3 is a top plan view of the parts shown in Fig. 1.

Like numerals denote like parts through the several views.

In the drawings, the gear blank 1 is arranged in a horizontal plane in accordance with common practice in hobbing. The axis $a$—$a$ of the hob 2 is inclined at an angle equal to the thread angle or helix angle of the hob. The hob is supported on an arbor 3. The rectangle 4 represents the pitch cylinder of the hob. The plane of the gear is represented by the line $b$—$b$, Fig. 1. Now passing the plane of the gear through the pitch cylinder, we obtain the arc of an ellipse, in accordance with the well known principles of descriptive geometry and conic sections. This elliptic arc passes through the three points 6, 7, 8, Fig. 3, the point 6 occurring at the left end of the hob, the point 7 at the middle, and the point 8 at the right end of the hob. The curvature of this arc will increase in proportion with the increase of the helix angle of the hob, but in any event the arc thus found occurs at the flattest portion of the ellipse, and hence within the limits of the hob, is a very close approximation to a circle.

Differently stated, the elliptic arc passing through the points 6, 7, 8 is hardly distinguishable from the arc of a circle passing through these three points. It is an elemental fact that a circle can be drawn through any three points, and if we pass a circle through the three points 6, 7, 8 it will be hardly distinguishable, if at all distinguishable, from the elliptic arc mentioned. The two coincide so nearly that they are shown as a single line between the points 6 and 8 in Fig. 3.

Now having passed a circle through the three points 6, 7 and 8, I employ this circle as the pitch circle for my improved hob tooth. The pressure angle indicated at the right end of Fig. 3 is a given factor—that is, has been previously determined in accordance with good practice, as well understood by those familiar with involute gears. Now having the pitch circle and the pressure angle, it is easy to determine the base circle from the well known formula,—base radius equals pitch radius multiplied by the cosine of the pressure angle. Now having the pitch line, base line and pressure angle, it is easy to produce the involute curve 10, 11, 12 which is the proper curve for the formation of a correct hob tooth made in accordance with my invention. In other words, we have a hob tooth which, instead of having a straight side, has a curved side, the curve being computed by passing the plane of the gear through an imaginary cylinder equal to the length of the hob and equal to the pitch diameter of the hob, and from the elliptical arc thus obtained we obtain an equivalent circle, which circle is used as the pitch circle of the improved hob tooth.

Having thus described my invention what I claim as new and desire to secure by Letters Patent is:

1. A hob having involute cutting teeth constructed on a base circle computed in the ordinary manner from a pitch circle which passes through the three following points, to wit, the two end points and the middle point of an elliptic arc formed by passing a plane through the pitch cylinder of the hob at an angle equal to the helix angle of the hob teeth.

2. A hob having involute cutting teeth constructed from a base line computed in the ordinary manner from a pitch circle which passes through the middle point and the two end points of the arc of an ellipse formed by passing a plane through a cylinder having a diameter equal to the diameter of the pitch line of the hob and a length equal approximately to its diameter, said plane lying normal to the pitch line of the hob tooth.

3. The method of producing involute toothed hobs which consists in employing a base circle computed in the ordinary manner from a pitch circle determined by the middle points and two end points of the elliptic arc resulting from the intersection of the pitch cylinder of the hob and a plane passed through said cylinder at an angle equal to the thread angle of the hob teeth.

4. The method of producing involute toothed hobs which consists in employing a base circle computed in the ordinary manner from a pitch circle determined by the middle points and two end points of the elliptic arc resulting from the intersection of the pitch cylinder of the hob and a plane passed through said cylinder at an angle equal to the thread angle of the hob teeth, the pitch cylinder being considered as having a length substantially equal to its diameter.

In witness whereof, I have hereunto subscribed my name.

CARL G. OLSON.